July 2, 1963    C. F. BOE ETAL    3,096,001
PRESSURE-PACKED POLYMERIZABLE MATERIALS
Filed March 9, 1959
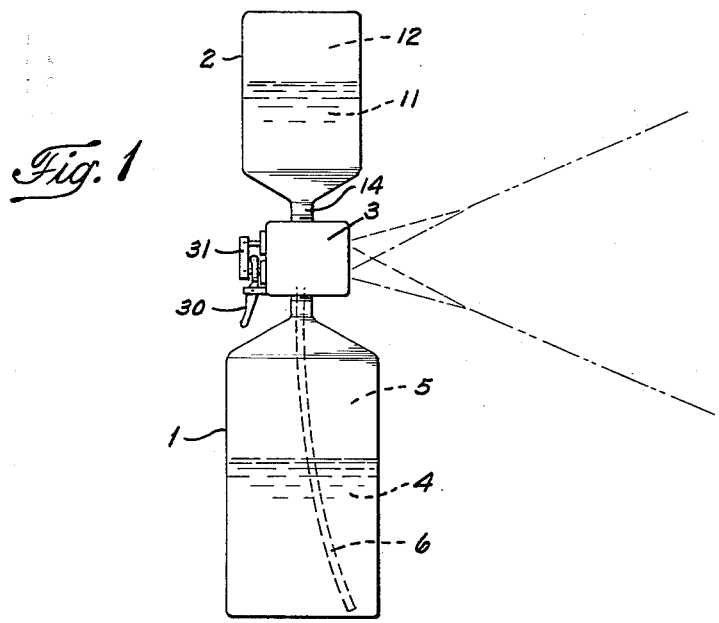
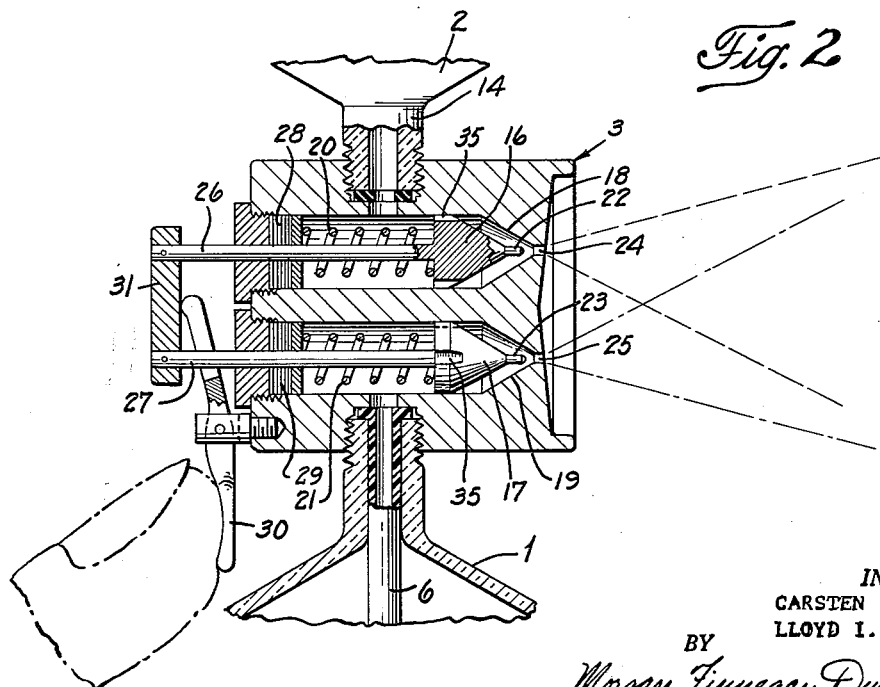
INVENTORS
CARSTEN F. BOE
LLOYD I. OSIPOW
BY
ATTORNEYS.

3,096,001
PRESSURE-PACKED POLYMERIZABLE
MATERIALS
Carsten F. Boe, Malvern, Pa., and Lloyd I. Osipow, Monsey, N.Y.; said Osipow assignor to said Boe
Filed Mar. 9, 1959, Ser. No. 798,034
13 Claims. (Cl. 222—135)

The present invention relates to new and useful pressure-packed polymerizable materials and to a process for using said materials to form plastic materials by the use of said product.

Objects and advantages of the invention will be set forth in part hereinfter and in part will be obvious herefrom, or may be learned by practice with the invention, the same being realized and attained by means of the steps, compositions and combinations pointed out in the appended claims.

The invention consists in the novel compositions, steps, combinations and improvements herein described.

The accompanying drawings referred to herein and constituting a part hereof illustrate one embodiment of the invention, and together with the description, serve to explain the principles of the invention.

It will be understood that the foregoing general description and the following detailed description as well are exemplary and explanatory of the invention but are not restrictive thereof.

In general, three methods are known for curing polymeric materials. These are: (a) baking, (b) the addition of catalysts and/or accelerators immediately before application, and (c) atmospheric oxidation over a prolonged period. Cure by baking requires special equipment which is not available in many situations. Where a catalyst is added prior to use there is considerable inconvenience in handling. Further, materials which are not used within several hours after mixing, set up in the pot and are wasted. A slow cure, extending over a period of many months, is obviously impractical for many applications.

Advantages accruing from this invention stem from the fact that cured organic polymers can be obtained quickly and conveniently without the use of special equipment. Further, since only applied material cures, there is no wastage. Thus, the housewife or home repair man can conveniently apply polymers which quickly harden to an insoluble, durable mass at room temperature which in practice is below about 150° F. These materials can be used as a permanent finish for floors and furniture, as a means of filling cracks in wood, as a waterproof coating for masonry, etc. In factories, applications include the sealing of cracks in equipment and leaks in pipes, and coatings for protection against corrosive chemicals.

A further advantage results from the fact that materials of relatively low molecular weight can be packaged and dispensed in high concentrations, since these lower molecular weight materials are more soluble and give lower viscosity solutions than materials of the same type having higher molecular weight. These lower molecular weight materials can undergo polymerization after being dispensed from the container.

The object of this invention is to provide a means of maintaining polymerizable material in an unpolymerized or partially polymerized form during storage, while simultaneously providing means for rapid polymerization at atmospheric conditions during application or shortly thereafter.

The objects of this invention can be realized by packaging the polymerizable material in a sealed container together with a liquefied gas. A valve for release of the contents is affixed to the container. Upon opening this valve, the vapor pressure of the liquefied gas expels the contents, for instance through a rising tube attached to the valve-outlet. The contents can be released in the form of a mist, a fine or coarse spray, a liquid stream or a foam as desired, depending upon the nature of the exit orifice, the pressure exerted by the gas, and the composition in the package. This expelling pressure can be kept substantially the same within the container, as new vapor is formed from the contents to replace the volume expelled. Another advantage presented by the use of liquefied gases as propellants, is that it is a very simple matter to heat the package and its content whenever it is desired to increase the expelling pressure within the package.

The polymerizable material may be present in solution in the liquefied gas. Alternatively, it can be dispersed or emulsified in the liquid phase of the propellant or in other liquids. Conversely, the liquefied gas can be dissolved, dispersed or emulsified in the polymerizable material or in some other liquid material. For example, such other material may be water in which both the polymerizable and propellant material are emulsified. Other components may also be present, such as solvents, plasticizers, resins, waxes, plastics, pigments, catalyst, inhibitors, anti-oxidants, stabilizers, emulsifying agents, protective colloids or other agents needed to produce the desired results.

The essential components within the container are the liquefied gas and the polymerizable material. Some systems require a latent catalyst. That is, a material which functions as a catalyst for polymerization upon exposure to the atmosphere, or when the pressure is reduced upon expelling of the contents, or by exposure to light. Other systems can include a volatile "inhibitor" or so-called "short-stop" which effectively stops the progress of polymerization within the package, but becomes ineffective when the content is expelled. Other systems may include inhibitors which are present in the container and are prevented from being expelled from the container, for example in solid particles which may be in suspension, but may be filtered out prior to the exit from the container. Other systems may include separate dispersions or emulsions of two or more materials which are kept apart within the container, but allowed to react with each other when the content has been expelled, so that one or both of these materials may polymerize further into the desired product. In such systems care must be exercised that the proper dispersing or emulsifying agents are used to prevent contact between dispersed particles.

Furthermore, both these materials must be essentially insoluble in the liquid wherein they are dispersed. Other systems may be emulsions or solutions or dispersions of liquefied gas in short-stopped latex or water-emulsions of the "oil-in-water" types. Still further systems may involve temporarily short-stopping the polymerizable plastic with a relative loose bond between reactive groups on the polymer and the liquefied gases, in such a manner that when the pressure is reduced when the content is expelled from the container, the gas evaporates and "activates" the polymer for further polymerization.

Under certain conditions it may be desirable to keep the polymerizable material and the activator physically separated in the container, in such a manner that they are simultaneously released and combined upon exit from the orifice.

Alternatively, the polymerization activator may be in a second container which is connected to a common discharge means together with the container holding the polymerizable material. The second container may be pressurized, or unpressurized and its contents may be expelled with the aid of the propellant present in the first container by the use of a Venturi.

In the following is a list of liquefied gases which are of interest to this invention. Generally speaking, it is not desirable to use a liquefied gas which will copolymerize with the polymerizable material. This will be seen in greater detail from the various examples presented. In some systems, it may also be of advantage to use gases absorbed or adsorbed on solid particles such as activated carbon or silica gel. Insofar as this invention is concerned these special gases are included in the general term of "liquefied gases," since they will, in essence, accomplish the same objects.

Methane, ethylene, ethane, carbon monoxide, nitrogen, carbon dioxide, methyl fluoride, trifluoromethane, ketene, propylene, propane, monochlorodifluoromethane, cyclopropane, monofluoroethane, chlorine, ammonia, propadiene, dichlorodifluoromethane, difluoroethane, difluoropropylene, hexafluoropropylene, tetrafluoropropylene, trifluoroethane, dimethylether, diazomethane, allylene, methylchloride, propyne, pentafluoropropylene, formaldehyde, trimethylboron, tetrafluoroethane, pentafluoroethane, tetrafluoromethane, vinylchloride, hexafluoroethane, isobutane, methylamine, butylene, butadiene, monochloropentafluoroethane, hexafluoropropane, propylfluoride, methylarsine, trimethylamine, dichlorotetrafluoroethane, methylbromide, methyltrimethylene, dimethylamine, methylethylether, methylsulfide, monochloropentafluoropropylene, ethylenoxide, ethylchloride, diacetylene, monochlorotrifluoropropylene, ethylamine, difluorochloroethylene, trichlorofluoromethane, neopentane, and like gases are examples of propellants which may be used in accordance with the present invention.

In some instances it is desirable to use a combination of two or more of the liquefied gases to obtain best sults with regards to self-propellancy, ease of expelling and efficiency of polymerization into the desired product. The particular gas to be used or combination of gas to be used will depend on the polymerizable material used as well as the end product desired. Generally speaking, it is preferred to use non-toxic and non-flammable gases to make the package safe to use by unskilled persons. However, sometimes a very small quantity of certain gas may have a profound effect on the inhibition and activation of the polymerizable material without being present in sufficient quantity to produce any hazard to the person using the package. An example of this, is carbonmonoxide which often quite effectively inhibit further polymerization.

The choice of propellant will depend upon both the composition and the intended application. For a molding compound, where gas entrapment is to be avoided, it is advisable to pressure-fill with a dry, inert gas, for example, nitrogen. Nitrogen also results in better density control and faster set in the case of foamed products. For use as a coating, where a fine spray is desired, a liquefied propellant miscible with the polymerizable material should be used.

In practising this invention, great care must be taken to avoid inter-reaction of the material of construction of the package and its contents in any undesirable manner. Thus, it is therefore sometimes desirable to provide the interior surfaces of the package with special coatings or liners to prevent any contact between the iron, or other structural material, and the polymerizable material. An example of this is found in several of the following specific examples, wherein traces of moisture must be carefully eliminated from the interior and the contents of the container, since very small amounts of such moisture will initiate the polymerization of these polymerizable materials. Sometimes, it may also be of advantage to incorporate special polymerization inhibitors into any interior coating of the container.

In certain special cases, it may be difficult to inhibit polymerization entirely within the container. This invention then provides for a convenient package which can be stored in a cool or regular refrigerated place between uses, since most polymerizable materials are less active at lower temperatures. Other advantages accrue from the fact that the polymerization of plastic materials is very sensitive to traces of impurities and small amounts of foreign material, wherefore it is possible to produce unique results from carefully prepared and factory-made compositions under controlled conditions packed in hermetically-sealed containers ready for the customer's use.

In preparing the composition according to this invention, the blending, mixing, dispersion or emulsification of the polymerizable material, the propellant and other ingredients may be conveniently made under pressure prior to filling the packages by pressure. The composition may, if desired, be passed through a pressurized colloid mill, or a homogenizer to insure intimate mixing or fine particle size of dispersion or emulsion.

The following are some typical examples of polymerizable materials that can be used in the practice of this invention:

(1) Vinyl-type monomers such as styrene, indene, vinyl carbazole, vinyl ether, propylene and isobutylene can be polymerized by Friedel-Crafts type catalysts, such as boron trifluoride, aluminum chloride, aluminum bromide and tin tetrachloride. However, moisture is required to initiate the reaction. Thus, monomers or partial polymers can be packaged with the propellant and catalyst under anhydrous conditions. After expulsion from the container, polymerization is rapid.

(2) Polymers formed from phenolic compounds, urea or melamine and formaldehyde or furfural can be cured using acid catalysts. It is possible to dissolve or disperse the polymer with the propellant and an acid salt, such as sodium bisulfate, which is insoluble in the polymer and the propellant. Acid formed by hydrolysis of the acid salt, on contact with atmospheric moisture, effects cure.

(3) Similarly furfural can be combined with metacresol or furfuryl alcohol, propellant and an insoluble acid-producing material, such as sodium bisulfate or aluminum chloride, under anhydrous conditions. On contact with atmospheric moisture, polymerization occurs.

(4) Unsaturated polymers, such as alkyd resins and polyesters of glycols and maleic anhydride and fumaric acid can be combined with metal driers, such as cobalt naphthenate, and an inorganic persalt, such as potassium persulfate, and the propellant under anhydrous conditions. Upon contact with moisture in the atmosphere, sufficient persalt dissolves to catalyze the further polymerization.

(5) Volatile retardants can also be included with the polymerizable material, catalyst and propellant. Thus, a partial polymer of chloroprene can be compounded with a propellant, oxidizing catalyst and volatile retardant such as ethylene, carbon monoxide or an aromatic amine.

(6) Addition polymerization involving ring opening are subject to catalytic influence by positive or negative ions. Addition polymerization of epoxides is strongly accelerated by bases. Water initiates these reactions. An epoxide resin can be compounded with solvent, propellant and a base. In the complete absence of water, the composition is stable. However, condensed water during application initiates the reaction.

(7) Polymers formed by addition reactions involving double bonds. Examples of such polymers include butadiene-styrene, methacrylate, polyvinyl acetate and polystyrene. These polymers can be prepared from their monomers using oxidation catalyst. The degree of polymerization can be increased by combining the polymer with monomer and catalyst. Here, volatile inhibitors are included with the monomer and oxidation catalyst. Polymer may also be present. Suitable inhibitors are gases which form unstable complexes with the monomer or polymer, such as carbon dioxide, carbon monoxide, nitrogen tetraoxide and sulfur dioxide. The polymer may be dissolved in the monomer or in an organic solvent, or it may be emulsified or dispersed in water or other immiscible liquids.

(8) Urethane polymers. These are most commonly prepared by reacting a diisocyanate, such as 2, 4 toluene diisocyanate with one or more polyfunctional reactive hydrogen compounds. Typical of the latter are low molecular weight (500 to 4,000) blocks of hydroxyl-terminated polyesters or polyethers, modified castor oils, or such simple substances as water, diamines, glycols, and triols. Variations of urethane polymers depend upon the choice and molecular weight of the difunctional molecule used to react with the diisocyanate and the choice of the diisocyanate used to form the linear polyurethane, as well as the molecular ratio of diisocyanate to difunctional molecule. There is also a wide choice of cross-linking agents, as well as a choice in the molecular ratio of linear polymer to cross-linking agent.

The following are specific examples of the manner in which this invention may be practiced:

(1)

| | Parts by weight |
|---|---|
| Styrene monomer | 40.0 |
| Tin tetrachloride | 0.5 |
| Dichlorodifluoromethane | 59.5 |

This composition can be used for filling cracks in wood and metal objects.

(2)

| | Parts by weight |
|---|---|
| Polystyrene (mol. wt.=2,000) | 20.0 |
| Tin tetrachloride | 0.2 |
| Trichlorofluoromethane | 40.0 |
| Dichlorodifluoromethane | 39.8 |

This composition is suitable for use as a casting resin.

(3)

| | Parts by weight |
|---|---|
| Indene | 20.0 |
| Tin tetrachloride | 0.2 |
| Methyl chloride | 79.8 |

This composition will provide a coating which will protect against corrosive fumes and vapors.

(4)

| | Parts by weight |
|---|---|
| Cresol-formaldehyde resin (mol. wt. less than 5,000) | 20.0 |
| Acetone | 20.0 |
| p-Toluene sodium sulfonate | 5.0 |
| Sodium bisulfate | 5.0 |
| Dichlorodifluoromethane | 50.0 |

This composition is suitable for sealing leaks, cracks, etc.

(5)

| | Parts by weight |
|---|---|
| m-Cresol | 10.0 |
| Furfural | 15.0 |
| Aluminum chloride | 1.0 |
| n-Butane | 74.0 |

This composition will form a coating which will protect against corrosive fumes and vapors.

(6)

| | Parts by weight |
|---|---|
| Polyester of ethylene glycol and maleic anhydride (mol. wt. 1,000–5,000) | 20.0 |
| Cobalt naphthenate | 0.5 |
| Potassium persulfate | 0.5 |
| Dichlorodifluoromethane | 59.0 |
| Methyl isopropyl ketone | 20.0 |

This composition will give a hard, durable coating to floors and furniture.

(7)

| | Parts by weight |
|---|---|
| Polymer of chloroprene (mol. wt. about 2,000) | 25.0 |
| Benzoyl peroxide | 0.2 |
| Potassium persulfate | 0.5 |
| Carbon monoxide | 0.3 |
| n-Butane | 34.0 |
| Acetone | 40.0 |

This composition will give a rubber-like polymer, suitable for application to the backing of rugs, to prevent them from sliding on the floor.

(8)

| | Parts by weight |
|---|---|
| Epoxide resin (mol. wt. 1,000) | 20.0 |
| Methyl ethyl ketone | 20.0 |
| Monoethanolamine | 1.0 |
| Dichlorodifluoromethane | 59.0 |

This composition is suitable for use as a clear varnish.

(9) A polyester diol was prepared by reacting 3 moles of ethylene glycol with 2.6 moles of adipic acid to produce a product with an average molecular weight of about 3,000 for the ester. A linear urethane was prepared by reacting 1.65 moles of 2, 4 toluene diisocyanate with one mole of the polyester in chlorobenzene. This solution, when pressurized and sprayed in combination with a solution of ethanolamine plus triethylamine, produced an excellent coating that cured at room temperature. In this instance one mole of ethanolamine was employed for cross-linking per two moles of diisocyanate used in forming the linear urethane. Triethylamine, 0.5 percent on total solids, catalyzed the reaction.

(10) A polypropylene glycol (#2025—Union Carbide) was combined with toluene diisocyanate (80/20 of 2,4/2,6 isomers) in the ratio of 100 parts of glycol to 40 parts of the diisocyanate to form the prepolymer, which was pressurized. A second container held the combination of foam stabilizer, catalyst and water in such proportions that they could be combined with the components of the first container in the proportion of 0.5 part of silicone DC–200 (Dow-Corning), 1.0 part of n-methyl morpholine, 0.5 part of triethylamine and 3.0 parts of water per 100 parts of the glycol. When the contents of the two containers were combined, a foam was produced which rose to its maximum height in two minutes and cured in fifteen minutes. The foam density was 2.2 pounds per cubic foot.

(11) A useful cement suitable for binding elastomers to metals and other surfaces may be prepared by placing a 10 percent solution of rubber (natural or GR–S) in one container and methylene (4-phenyl isocyanate) in the other. Application is preferably at the rate of 5 parts of rubber to 1 part of methylene bis (4-phenyl isocyanate).

(12) A semi-rigid foam may be prepared as follows: a prepolymer is prepared by heating for one hour at 275° F., a mixture composed of 1,300 grams of toluene diisocyanate (80/20 of 2,4/2,6 isomers), 1,800 grams of castor oil, and 50 grams of silica (0.5 to 1.0 micron). A catalyst mixture is prepared by dissolving 45 grams of dimethylethanolamine and 64 grams of Triton X-100 (Rohm & Haas) in 100 grams of water. The two mixtures are packaged in separate containers and the foamed polymer is produced by combining the mixtures in the ratio of 100 grams of the prepolymer with 7.5 grams of the catalyst mixture.

Pigments, oil-soluble dyes, natural resins, waxes and plasticizers can be included with Examples 1 through 12, thus increasing the number of examples many times.

Of the drawings:

FIGURE 1 is a schematic view of a two-container system representing an embodiment of the present invention, in which two containers are connected to a common discharge valve means, and FIGURE 2 is an enlarged view in vertical section of the valve means of FIGURE 1.

Referring now to the accompanying drawings, two pressurizable containers 1 and 2 are connected to a common valve means 3. The containers may conveniently be spray cans of the so-called "aerosol" type.

Container 1 contains a polymerizable material 4 in the liquid state which is pressurized by a propellant 5, which may be a liquefied gas. The pressure of the propellant gas is adapted to drive the polymerizable material 4 through the tube 6 into valve means 3 and out into the atmosphere in a mist or spray.

Container 2 may contain a material 11, which may be a polymerization catalyst and a propellant gas 12 which is adapted to push material 11 through outlet 14 into valve means 3 and out into the atmosphere.

FIGURE 2 shows valve means 3 comprising two separate valves 16 and 17, which are adapted to be pressed against valve seats 18 and 19 by springs 20 and 21. Valves 16 and 17 are provided with pins 22 and 23 which are adapted to enter outlet orifices 24 and 25 to clear them from clogging or other obstructions. The valves are actuated by shafts 26 and 27 which pass through sealing gaskets 28 and 29. Shafts 26 and 27 are slidably actuated against the pressure of springs 20 and 21 by the movement of lever 30 acting on crossbar 31. Each valve 16 and 17 is provided with communicating channels 35 which permit the material from the containers to pass around said valves, when they are in open position, and through orifices 22 and 23. Proper execution of said orifices and said channels then permit a two-stage expansion of the liquids at points very close to the exits. This provides good atomization when liquefied gases are used as the propellants. The annular spaces between valves 16 and 17 and valve seats 18 and 19 act as small expansion chambers in which the propellant gases can effectively expand the liquid material into a spray prior to passage through orifices 22 and 23.

Said orifices are advantageously located relatively close to each other and so adjusted together with other cooperating parts of said valve means that considerable intermingling of the material particles takes place shortly after the spray leaves valve means 30. This permits a substantially complete mixing of the polymerizable material and the catalyst or other material when they are deposited at the desired location.

Although a stationary valve body is shown in the accompanying drawings, it is equally feasible to use a stationary valve having communicating channels to the respective cans and have the valve seat pressed against said valve from the outside by a suitable mechanism and in effect obtain substantially the same advantages of non-clogging mechanical cleaning of outlet orifices and separate discharge of the two materials with good sealing against the outer atmosphere.

Likewise, though the respective containers are shown in opposed axial disposition it might be equally desirable to have them disposed in side-by-side relationship.

This application is a continuation-in-part of our copending application Serial No. 582,958, filed May 7, 1956.

The invention in its broader aspects is not limited to the specific steps, compositions and combinations described but departures may be made therefrom, within the scope of the accompanying claims, without departing from the principles of the invention and without sacrificing its chief advantages.

We claim:

1. A package comprising a self-sufficient pressure-tight container having a closable outlet and containing a polymerizable material selected from the group consisting of reactive monomers and prepolymers containing a vinyl group; phenol, melamine and urea-aldehyde prepolymers; unsaturated polyesters derived from a polyhydric alcohol and maleic and fumaric acid and anhydride; epoxy resins, and polyurethane prepolymers, said polymerizable material being maintained in said container under such conditions that it is incapable of conversion to a higher molecular weight organic polymer while in said container, said polymerizable material of such nature that it will convert at a temperature below about 150° F. rapidly and completely to an organic polymer when released from said container, and a propellant that is a gas at room temperature and pressure, said propellant being present in a sufficient quantity and exerting sufficient pressure within the container to expel said polymerizable material without further replenishment of propellant from a source outside the container.

2. A package as set forth in claim 1, wherein the polymerizable material contains isocyanate as the reactive group.

3. A package as set forth in claim 1, wherein the polymerizable material contains epoxy as the reactive group.

4. A package as set forth in claim 1, including a polymerization inhibiting agent.

5. A package as set forth in claim 1, including an agent for activating polymerization.

6. A package as set forth in claim 5, wherein said polymerizable material is separated from the activator until release from the container.

7. A package as set forth in claim 1, wherein a part of said volatile propellant inhibits polymerization until said part is evaporated from said polymerizable material when expelled from said container.

8. A package as set forth in claim 1, wherein said polymerizable material is dispersed in an inert liquid immiscible with the polymerization material and said package also has particles of a polymerization activator separately therein dispersed, said activator being adapted to initiate and complete the polymerization upon contact with said polymerizable material when jointly expelled from said container and upon evaporation of said immiscible liquid.

9. A package as set forth in claim 1, including a dispersion agent capable of maintaining a uniform dispersion within the container.

10. A package as set forth in claim 1, wherein said volatile propellant is a hydrocarbon that is liquid under its own pressure within said container, but is a gas at room temperature and pressure.

11. A package as set forth in claim 1, wherein said volatile propellant comprises a halogenated hydrocarbon that is liquid under its own pressure within said container, but is a gas at room temperature and pressure.

12. A package as set forth in claim 1, wherein said volatile propellant comprises an ether that is liquid under its own pressure within said container, but is a gas at room temperature and pressure.

13. A pressure-tight container having a closable outlet and containing a polymerizable material selected from the group consisting of reactive monomers and prepolymers containing a vinyl group; phenol, melamine and urea-aldehyde prepolymers; unsaturated polyesters derived from a polyhydric alcohol and maleic and fumaric acid and anhydride; epoxy resins, and poly-urethane prepolymers, said polymerizable material being maintained in said container under such conditions that it is incapable of conversion to a higher molecular weight organic polymer while in said container, said polymerizable material of such nature that it will polymerize rapidly and completely when released from said container, and a propellant that is a gas at room temperature and pressure, said propellant being present in a sufficient quantity and exerting sufficient pressure within the container to expel said polymerizable material without further replenishment of propellant from a source outside the container, a second container containing an agent capable of causing polymerization of the polymerizable material in the first container to an organic polymer and a propellant in a sufficient quantity and exerting sufficient pressure within the container to expel said agent, said first container and said second container being connected to a valve means adapted to permit the separate and simultaneous discharge of the contents of said containers.

References Cited in the file of this patent
UNITED STATES PATENTS

| | | |
|---|---|---|
| 987,363 | Hodgdon | Mar. 21, 1911 |
| 1,892,750 | Rotheim | Jan. 3, 1933 |
| 2,200,675 | Northcutt | May 14, 1940 |
| 2,524,590 | Boe | Oct. 3, 1950 |
| 2,617,780 | Lutz | Nov. 11, 1952 |
| 2,662,865 | Beauchamp | Dec. 15, 1953 |
| 2,706,724 | Bass | Apr. 19, 1955 |
| 2,854,425 | Boger et al. | Sept. 30, 1958 |
| 2,916,469 | Lal | Dec. 8, 1959 |
| 2,929,794 | Simon et al. | Mar. 22, 1960 |
| 2,929,802 | Katz | Mar. 22, 1960 |
| 2,933,461 | Mullen | Apr. 19, 1960 |